US012230284B2

(12) United States Patent
Li

(10) Patent No.: US 12,230,284 B2
(45) Date of Patent: Feb. 18, 2025

(54) METHOD AND APPARATUS FOR FILTERING OUT BACKGROUND AUDIO SIGNAL AND STORAGE MEDIUM

(71) Applicant: TENCENT TECHNOLOGY (SHENZHEN) COMPANY LIMITED, Guangdong (CN)

(72) Inventor: Dong Ming Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 305 days.

(21) Appl. No.: 17/346,525

(22) Filed: Jun. 14, 2021

(65) Prior Publication Data

US 2021/0304776 A1 Sep. 30, 2021

Related U.S. Application Data

(63) Continuation of application No. PCT/CN2020/087376, filed on Apr. 28, 2020.

(30) Foreign Application Priority Data

May 14, 2019 (CN) ........................ 201910399589.X

(51) Int. Cl.
*G10L 19/018* (2013.01)
*G10L 21/0224* (2013.01)
(Continued)

(52) U.S. Cl.
CPC ........ *G10L 19/018* (2013.01); *G10L 21/0224* (2013.01); *G10L 21/0232* (2013.01); *G10L 21/0272* (2013.01)

(58) Field of Classification Search
CPC ............... G10L 19/018; G10L 21/0224; G10L 21/0232; G10L 21/0272
See application file for complete search history.

(56) References Cited

U.S. PATENT DOCUMENTS 9,165,559 B2 * 10/2015 Baum .................. G10L 19/018
9,195,431 B2 * 11/2015 LaRosa ................ G11B 27/034
(Continued)

FOREIGN PATENT DOCUMENTS

| | | | |
|---|---|---|---|
| CN | 106601261 | A | 4/2017 |
| CN | 106716527 | A | 5/2017 |
| CN | 110047497 | A | 7/2019 |
| EP | 2 779 162 | A2 | 9/2014 |

OTHER PUBLICATIONS

Lin, Yiqing, and Waleed H. Abdulla, Audio Watermark: A Comprehensive Foundation Using MATLAB, 2014, Springer. (Year: 2014).*

(Continued)

*Primary Examiner* — Daniel C Washburn
*Assistant Examiner* — James Boggs
(74) *Attorney, Agent, or Firm* — Sughrue Mion, PLLC

(57) ABSTRACT

A method for filtering out a background audio signal includes: obtaining a first audio signal collected during playing of the background audio signal, the background audio signal being an audio signal obtained by adding watermark information to an original audio signal; separating the first audio signal to obtain the watermark information and a second audio signal without the watermark information; querying the preset correspondence according to the watermark information to obtain the original audio signal corresponding to the watermark information; and filtering out the original audio signal from the second audio signal to obtain a target audio signal.

17 Claims, 9 Drawing Sheets

(51) Int. Cl.
*G10L 21/0232* (2013.01)
*G10L 21/0272* (2013.01)

(56) References Cited

U.S. PATENT DOCUMENTS

| | | | | | |
|---|---|---|---|---|---|
| 9,275,625 | B2 * | 3/2016 | Kim | G10L 21/0216 |
| 9,317,872 | B2 * | 4/2016 | Courtney, III | G06Q 30/0267 |
| 9,384,754 | B2 * | 7/2016 | Des Jardins | G10L 19/018 |
| 9,432,789 | B2 * | 8/2016 | Yoshizawa | H04R 3/005 |
| 9,466,304 | B2 * | 10/2016 | Zhang | G10L 19/018 |
| 9,978,382 | B2 * | 5/2018 | Megías Jiménez | G10L 19/018 |
| 10,147,433 | B1 * | 12/2018 | Bradley | G10L 19/018 |
| 10,325,591 | B1 * | 6/2019 | Pogue | G10L 21/0208 |
| 10,448,154 | B1 * | 10/2019 | Zhan | H04R 3/04 |
| 10,580,421 | B2 * | 3/2020 | Topchy | G10L 19/06 |
| 2013/0058496 | A1 * | 3/2013 | Harris | G10L 21/0208 381/94.1 |
| 2018/0144755 | A1 * | 5/2018 | Lee | H04N 21/4394 |
| 2019/0206417 | A1 * | 7/2019 | Woodruff | G10L 21/028 |

OTHER PUBLICATIONS

Aparna, S., and P. S. Baiju, “Audio Watermarking Technique using Modified Discrete Cosine Transform”, Jul. 2016, 2016 International Conference on Communication Systems and Networks (ComNet), pp. 227-230. (Year: 2016).*

Wang, Mu-Liang, Hong-Xun Lin, and Mn-Ta Lee, “Robust Audio Watermarking Based on MDCT Coefficients”, Aug. 2012, 2012 Sixth International Conference on Genetic and Evolutionary Computing, pp. 372-375. (Year: 2012).*

Xie, Ling, Jia-shu Zhang, and Hong-jie He, “NDFT-based Audio Watermarking Scheme with High Security”, Aug. 2006, 18th International Conference on Pattern Recognition (ICPR’06), vol. 4, pp. 270-273. (Year: 2006).*

Shelke, R. D., and Milind U. Nemade, “Audio Watermarking Techniques for Copyright Protection: A Review”, Dec. 2016, 2016 International Conference on Global Trends in Signal Processing, Information Computing and Communication (ICGTSPICC), pp. 634-640. (Year: 2016).*

Mears, Paul, and Scott Brown “Nielsen Watermarking”, Oct. 2011, 2011 SMPTE Annual Technical Conference & Exhibition, pp. 2-11. (Year: 2011).*

Chinese Office Action for 201910399589.X dated Oct. 21, 2020.

Written Opinion of the International Searching Authority for PCT/CN2020/087376 dated Jul. 24, 2020 (PCT/ISA/237).

International Search Report for PCT/CN2020/087376 dated, Jul. 24, 2020 (PCT/ISA/210).

* cited by examiner

METHOD AND APPARATUS FOR FILTERING OUT BACKGROUND AUDIO SIGNAL AND STORAGE MEDIUM

CROSS-REFERENCE TO RELATED APPLICATION

This application is a bypass continuation application of International Application No. PCT/CN2020/087376, filed Apr. 28, 2020 and entitled "BACKGROUND AUDIO SIGNAL FILTERING METHOD AND APPARATUS, AND STORAGE MEDIUM", which claims priority to Chinese Patent Application No. 201910399589.X, filed on May 14, 2019 with the China National Intellectual Property Administration and entitled "METHOD AND APPARATUS FOR FILTERING OUT BACKGROUND AUDIO SIGNAL AND STORAGE MEDIUM", the disclosures of which are herein incorporated by reference in their entireties.

FIELD

Embodiments of the disclosure relate to the technical field of audio processing, and in particular, to a technology for filtering out a background audio signal.

BACKGROUND

With the development of the audio processing technology and wide application of the audio, processing of audio signals is involved in a plurality of fields such as speech recognition and voice control. Under normal circumstances, the obtained audio signals include a background audio signal, and presence of the background audio signal may affect the processing effect of the audio signals. Therefore, how to filter out the background audio signal from the audio signal becomes a key research point in the audio processing technology.

In the related art, a method for filtering out an accompaniment audio signal from a song audio signal is includes: obtaining a song audio signal including a singing composition and an accompaniment composition and an accompaniment audio signal corresponding to the song audio signal, a time synchronization correspondence existing between the song audio signal and the accompaniment audio signal, and the accompaniment audio signal being greatly correlated with the accompaniment composition in the song audio signal. By comparing the song audio signal with the accompaniment audio signal, the accompaniment audio signal is filtered out from the song audio signal to obtain a singing audio signal, so that a human voice is extracted from the song audio signal.

According to the above solution, the song audio signal needs to be obtained in advance, and the accompaniment audio signal corresponding to the song audio signal also needs to be separately obtained. If only the song audio signal is obtained, the accompaniment audio signal cannot be filtered out from the song audio signal. As a result, the related art method is limited by the accompaniment audio signal, which has poor versatility and a relatively limited application range.

SUMMARY

Embodiments of the disclosure provide a method and an apparatus for filtering out a background audio signal and a storage medium with high accuracy, which may effectively improve the versatility and expand the application range.

According to one aspect, a method for filtering out a background audio signal is provided, performed by an electronic device, the method including:

obtaining a first audio signal collected during playing of the background audio signal, the background audio signal being an audio signal obtained by adding watermark information to an original audio signal;

separating the first audio signal to obtain the watermark information and a second audio signal without the watermark information;

querying a preset correspondence according to the watermark information to obtain the original audio signal corresponding to the watermark information, the preset correspondence including a correspondence between the original audio signal and the watermark information added to the original audio signal; and filtering out the original audio signal from the second audio signal to obtain a target audio signal.

In an embodiment, the first audio signal is a first audio time-domain signal, the second audio signal is a second audio time-domain signal, and the separating the first audio signal to obtain the watermark information and a second audio signal without the watermark information includes:

transforming the first audio time-domain signal to obtain a first audio frequency-domain signal;

separating the first audio frequency-domain signal to obtain the watermark information and a second audio frequency-domain signal without the watermark information; and inversely transforming the second audio frequency-domain signal to obtain the second audio time-domain signal.

In an embodiment, the original audio signal is an original audio time-domain signal, and the querying a preset correspondence according to the watermark information to obtain the original audio signal corresponding to the watermark information includes:

querying the preset correspondence according to the watermark information to obtain the original audio time-domain signal corresponding to the watermark information.

In an embodiment, the watermark information includes a plurality of watermark information segments arranged in a sequence, and the querying a preset correspondence according to the watermark information to obtain the original audio signal corresponding to the watermark information includes:

separately querying the preset correspondence according to each of the plurality of watermark information segments to obtain original audio signal segments corresponding to the plurality of watermark information segments; and combining the original audio signal segments corresponding to the plurality of watermark information segments according to the sequence in which the plurality of watermark information segments are arranged, to obtain the original audio signal.

In an embodiment, before the obtaining a first audio signal collected during playing of the background audio signal, the method further includes:

obtaining the original audio signal, and allocating the watermark information to the original audio signal;

adding the watermark information to the original audio signal to obtain the background audio signal; and establishing the correspondence between the original audio signal and the watermark information as the preset correspondence.

In an embodiment, the allocating the watermark information to the original audio signal includes:

obtaining identification information of the original audio signal, and generating the watermark information including the identification information according to the identification information.

In an embodiment, the original audio signal is an original audio time-domain signal, the background audio signal is a background audio time-domain signal, and the adding the watermark information to the original audio signal to obtain the background audio signal includes:

transforming the original audio time-domain signal to obtain an original audio frequency-domain signal;

adding the watermark information to the original audio frequency-domain signal to obtain a background audio frequency-domain signal; and inversely transforming the background audio frequency-domain signal to obtain the background audio time-domain signal.

In an embodiment, the original audio signal includes a plurality of original audio signal segments arranged in a sequence, and the adding the watermark information to the original audio signal to obtain the background audio signal includes:

respectively adding, to each of the plurality of original audio signal segments, watermark information segments allocated to the plurality of original audio signal segments, to obtain a plurality of background audio signal segments corresponding to the plurality of original audio signal segments; and combining the plurality of background audio signal segments according to the sequence in which the plurality of original audio signal segments are arranged, to obtain the background audio signal.

According to another aspect, an apparatus for filtering out a background audio signal is provided, the apparatus including:

at least one memory configured to store program code; and at least one processor configured to read the program code and operate as instructed by the program code, the program code including:

first audio obtaining code configured to cause the at least one processor to obtain a first audio signal collected during playing of the background audio signal, the background audio signal being an audio signal obtained by adding watermark information to an original audio signal;

separation code configured to cause the at least one processor to separate the first audio signal to obtain the watermark information and a second audio signal without the watermark information;

query code configured to cause the at least one processor to query a preset correspondence according to the watermark information to obtain the original audio signal corresponding to the watermark information, the preset correspondence including a correspondence between the original audio signal and the watermark information added to the original audio signal; and filtering code configured to cause the at least one processor to filter out the original audio signal from the second audio signal to obtain a target audio signal.

In an embodiment, the first audio signal is a first audio time-domain signal, the second audio signal is a second audio time-domain signal, and the separation code includes:

first transformation sub-code configured to cause the at least one processor to transform the first audio time-domain signal to obtain a first audio frequency-domain signal;

separation sub-code configured to cause the at least one processor to separate the first audio frequency-domain signal to obtain the watermark information and a second audio frequency-domain signal without the watermark information; and second transformation code configured to cause the at least one processor to inversely transform the second audio frequency-domain signal to obtain the second audio time-domain signal.

In an embodiment, the query code includes:

first query sub-code configured to cause the at least one processor to query the preset correspondence according to the watermark information to obtain an original audio time-domain signal corresponding to the watermark information.

In an embodiment, the watermark information includes a plurality of watermark information segments arranged in a sequence, and the query code includes:

second query sub-code configured to cause the at least one processor to: query the preset correspondence according to the plurality of watermark information segments separately to obtain original audio signal segments corresponding to the plurality of watermark information segments; and combination sub-code configured to cause the at least one processor to combine the original audio signal segments corresponding to the plurality of watermark information segments according to the sequence in which the plurality of watermark information segments are arranged, to obtain the original audio signal.

In an embodiment, the apparatus further includes:

allocation sub-code configured to cause the at least one processor to obtain the original audio signal, and allocate the watermark information to the original audio signal;

adding sub-code configured to cause the at least one processor to add the watermark information to the original audio signal to obtain the background audio signal; and correspondence establishment sub-code configured to cause the at least one processor to establish the correspondence between the original audio signal and the watermark information as the preset correspondence.

In an embodiment, the allocation code includes:

generation sub-code configured to cause the at least one processor to obtain identification information of the original audio signal, and generate the watermark information including the identification information according to the identification information.

In an embodiment, the original audio signal is an original audio time-domain signal, the background audio signal is a background audio time-domain signal, and the adding code includes:

first transformation sub-code configured to cause the at least one processor to transform the original audio time-domain signal to obtain an original audio frequency-domain signal;

first adding sub-code configured to cause the at least one processor to add the watermark information to the original audio frequency-domain signal to obtain a background audio frequency-domain signal; and second transformation sub-code configured to cause the at least one processor to inversely transform the background audio frequency-domain signal to obtain the background audio time-domain signal.

In an embodiment, the original audio signal includes a plurality of original audio signal segments arranged in a sequence, and the adding code includes:

second adding sub-code configured to cause the at least one processor to respectively add, to the corresponding original audio signal segments, watermark information segments allocated to the plurality of original audio signal segments, to obtain a plurality of background audio signal segments corresponding to the plurality of original audio signal segments; and combination sub-code configured to cause the at least one processor to combine the plurality of background audio signal segments according to the sequence in which the plurality of original audio signal segments are arranged, to obtain the background audio signal.

According to another aspect, an electronic device is provided, including a processor and a memory storing a computer program, the computer program being loaded and executed by the processor to implement the operations performed in the method for filtering out a background audio signal.

According to yet another aspect, a computer-readable storage medium is provided, the computer-readable storage medium storing a computer program, the computer program being loaded and executed by a processor to implement the operations performed in the method for filtering out a background audio signal.

According to still another aspect, a computer program product is provided, including instructions, the instructions, when run on a computer, causing the computer to perform the operations performed in the method for filtering out a background audio signal.

BRIEF DESCRIPTION OF THE DRAWINGS

To describe the technical solutions in the example embodiments of the disclosure more clearly, the following briefly introduces the accompanying drawings for describing the example embodiments. The accompanying drawings in the following description show only some embodiments of the disclosure, and a person of ordinary skill in the art may still derive other accompanying drawings from the accompanying drawings without creative efforts.

DETAILED DESCRIPTION

To make objectives, technical solutions, and advantages of the embodiments of the disclosure clearer, the following further describes in detail implementations of the disclosure with reference to the accompanying drawings.

Embodiments of the disclosure provide a method for filtering out a background audio signal, which may be applicable to a plurality of implementation environments.

In an example implementation environment, the implementation environment includes a smart device. The smart device has functions of playing an audio signal, collecting the audio signal, and processing the audio signal, and may include various types of terminal devices such as a mobile phone, a computer, a tablet computer, a smart TV, a smart speaker, and the like.

The smart device may add watermark information to an original audio signal in advance to obtain a background audio signal. If the audio signal is collected during playing of the background audio signal, the background audio signal may be filtered out from the collected audio signal according to the watermark information, to obtain a target audio signal without the background audio signal in a space during playing of the background audio signal. The space where the smart device is located may include a room, a floor, a building, or any other site(s) where the smart device is located.

Figure 1:
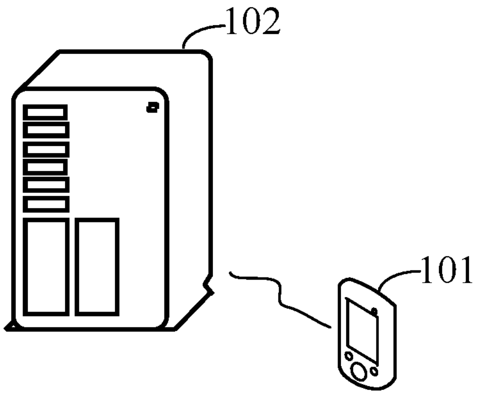
FIG. 1 is a schematic diagram of an example implementation environment according to an embodiment of the disclosure.

FIG. 1 is a schematic diagram of an example implementation environment according to an embodiment of the disclosure. The implementation environment includes: a smart device 101 and a server 102, the smart device 101 and the server 102 being connected via a network.

The smart device 101 has the function of playing the audio signal and collecting the audio signal, and may include a plurality of types of terminal devices such as a mobile phone, a computer, a tablet computer, a smart TV, a smart speaker, and the like. The server 102 has a function of processing audio signals, and may be one server, a server cluster formed by several servers, or a cloud computing service center.

The server 102 may add watermark information to an original audio signal in advance to obtain a background audio signal, and provide the background audio signal to the smart device 101. The smart device 101 may collect an audio signal during playing of the background audio signal, and upload the audio signal to the server 102, so that the server 102 may filter out the background audio signal according to the watermark information in the audio signal to obtain a target audio signal without the background audio signal in a space during playing of the background audio signal by the smart device 101.

Figure 2:
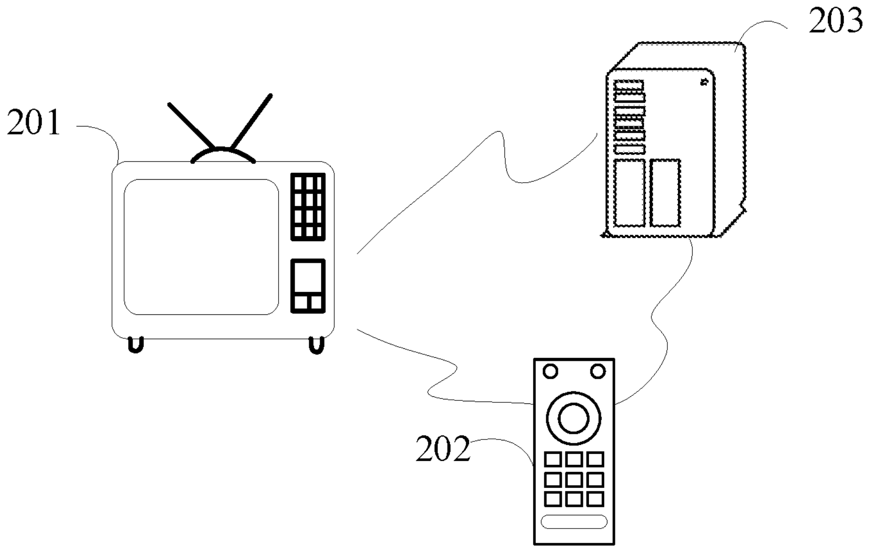
FIG. 2 is a schematic diagram of an example implementation environment according to an embodiment of the disclosure.

FIG. 2 is a schematic diagram of an example implementation environment according to an embodiment of the disclosure. The implementation environment includes: a playback device 201, a collection device 202, and a server 203, the playback device 201 and the collection device 202 being in the same space and both connected to the server 203 through a network.

The playback device 201 and the collection device 202 are in the same space, which means that the playback device 201 and the collection device 202 are located in the same room, or on the same floor, or in the same building, or in the same another site. The playback device 201 may be located in an audio collection range of the collection device 202, and the collection device 202 may collect the audio signal played by the playback device 201.

The playback device 201 has the function of playing the audio signal, and may include a plurality of types of terminal devices such as, for example but not limited to, a mobile phone, a computer, a tablet computer, a smart TV, a smart speaker, and the like. The collection device 202 has the function of collecting the audio signal, and may include a plurality of types of terminal devices such, for example but not limited to, as a mobile phone, a computer, a tablet computer, a smart remote control, a smart microphone, a smart TV, a smart speaker, and the like. The server 203 has a function of processing audio signals, and may be one server, a server cluster formed by several servers, or a cloud computing service center.

The server 102 may add watermark information to an original audio signal in advance to obtain a background audio signal, and provide the background audio signal to the playback device 201. During playing of the background audio signal by the playback device 201, the collection device 202 may collect an audio signal and upload the audio signal to the server 102, so that the server 102 may filter out the background audio signal according to the watermark information to obtain a target audio signal without the background audio signal in a space during playing of the background audio signal by the playback device 201.

Considering that the background audio signal in the same space may be collected during collection of the target audio signal and causes interference, an embodiment of the disclosure provides an audio processing method based on a controllable background audio signal. The watermark information is added to the original audio signal to obtain a controllable background audio signal. When the audio signal is collected during playing of the background audio signal, the audio signal correspondingly includes the target audio signal and the background audio signal. In this case, the watermark information included in the background audio signal may be used as a mark, and the background audio signal is filtered out from the collected audio signal by identifying the watermark information. The method includes two stages: a background audio signal preparation stage and a background audio signal filtering stage. Operation procedures of the two stages are to be specifically described below.

Figure 3:
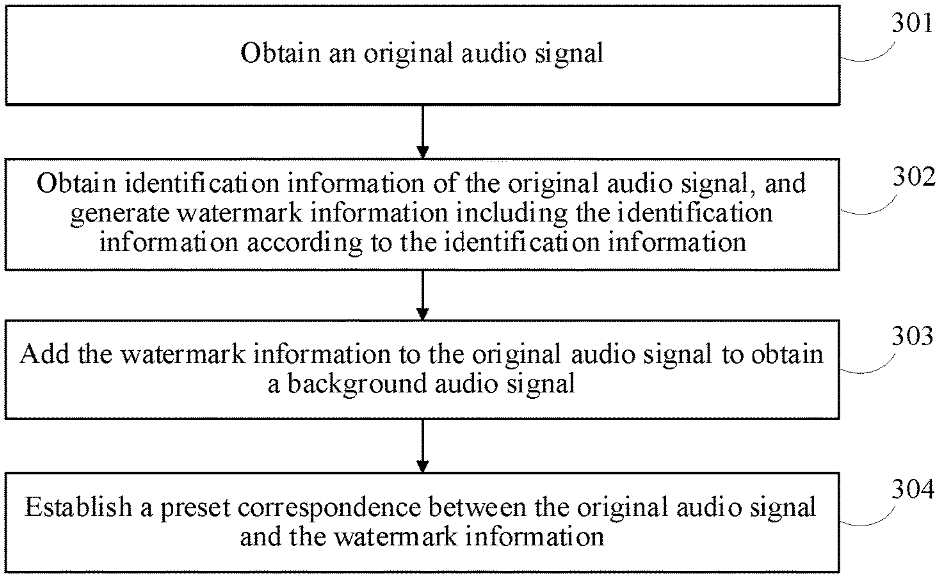
FIG. 3 is a flowchart of a method for establishing a preset correspondence between an original audio signal and watermark information according to an embodiment of the disclosure.

FIG. 3 is a flowchart of a method for establishing a preset correspondence between an original audio signal and watermark information according to an embodiment of the disclosure. In the embodiment of the disclosure, the operation procedure of the background audio signal preparation stage is described. The method may be performed by a server or a smart device. In the embodiment of the disclosure, the method is performed by a server, for example. Referring to FIG. 3, the method includes:

301: Obtain an original audio signal.

The original audio signal may be any kind of audio signal. In terms of content of the original audio signal, the original audio signal may include a song audio signal, a TV play audio signal, a movie audio signal, or other audio signal. In terms of sources of the original audio signal, the original audio signal may be stored in a server by an operator, or transmitted to the server by another device, or the original audio signal may further be an audio signal played by another device that is collected by the server.

In the embodiment of the disclosure, an original audio signal is used as an example to describe a process of generating a background audio signal. In an embodiment, the server may obtain a plurality of original audio signals, thereby generating the background audio signal corresponding to each of the original audio signals. In addition, the purpose of obtaining the original audio signal is: obtaining the background audio signal by adding watermark information to the original audio signal, so as to filter out the background audio signal from the collected audio signal during playing of the background audio signal by a user.

When the played audio signal is the background audio signal to which watermark information has been added, the method provided in the embodiment of the disclosure may filter out the background audio signal to obtain a target audio. Therefore, in order to improve comprehensive application of the method provided in the embodiments of the disclosure and implement wide application of a solution for filtering out the background audio signal, as many original audio signals as possible may be obtained. For example, the server may collect a large number of original audio signals released on the Internet, so as to generate the background audio signal corresponding to each of the original audio signals. In addition, the plurality of obtained original audio signals may include as many types as possible for users who like corresponding types of audio signals to play.

If an excessively large number of obtained original audio signals leads to an excessively large amount of processing and an excessively small number of obtained original audio signals leads to an excessively small number of generated background audio signals, the scope of application of the disclosure may become relatively small. Therefore, comprehensively considering the above two factors, in an embodiment, a plurality of original audio signals whose popularity is greater than a preset threshold may be obtained. The popularity may be based on a degree to which the original audio signal is welcomed by the users, which may be determined according to data such as an amount of play, a search volume, a number of users followed by a publisher, and the like. Higher popularity indicates a larger probability that the original audio signal is played, and lower popularity indicates a smaller probability that the original audio signal is played. By obtaining the original audio signal with higher popularity, the amount of processing may be reduced while improving wide application of the solution of the disclosure.

For example, a server collects audio signals of a plurality of TV plays (or TV programs) and uses an audio signal of a more popular TV play as an original audio signal to generate a background audio signal corresponding to the original audio signal. When the subsequent user requests to play the TV play, the background audio signal to which watermark information has been added is to be played instead of the original audio signal without the watermark information.

302. Obtain identification information of the original audio signal, and generate watermark information including the identification information according to the identification information.

After the server obtains the original audio signal, the watermark information may be allocated to the original audio signal, so that the watermark information may be added to the original audio signal. The watermark information, also referred to as digital watermark information, refers to information expressed in a digital form, and may be embedded in the audio signal to generate an audio signal including the watermark information.

In an embodiment, the server also obtains detailed information of the original audio signal during obtaining of the original audio signal. The detailed information is used for describing the original audio signal and may include a plurality of pieces of information such as an author, a duration, a type, release time, and the like. In addition, the detailed information includes at least identification information. The identification information may be used for uniquely identifying the corresponding original audio signal, and may include a name or a serial number of the original audio signal, or the like. For example, when the original audio signal is a movie, the identification information of the original audio signal is a name of the movie, or when the original audio signal is a TV play, the identification information of the original audio signal is a combination of the name of the TV play and a number of episodes to which the original audio signal belongs. The server may generate watermark information including the identification information according to the identification information. The watermark information may be in any data form. For example, the server encodes the identification information, converts the identification information into a binary code to serve as the watermark information.

In another embodiment, the server may further randomly allocate watermark information to the original audio signal, or may further allocate watermark information in other ways, as long as the watermark information allocated to different original audio signals is different from each other.

Since the watermark information allocated to different original audio signals is different from each other, the watermark information may be used for distinguishing between different audio signals. In addition, the watermark information has the advantages of invisibility, stability, and security, is not easy to be tampered with, and may not affect the playback effect of the audio signal.

303. Add the watermark information to the original audio signal to obtain a background audio signal.

After unique watermark information is allocated to the original audio signal, the watermark information is added to the original audio signal, and the obtained audio signal is used as the background audio signal. The watermark information may be added to the original audio signal by using a watermark embedding algorithm. The watermark embedding algorithm may be, for example but not limited to, a coefficient quantization method, a spatial domain algorithm, a transform domain algorithm, a least significant bit algorithm, an echo hiding algorithm, a phase encoding algorithm, and the like.

In an embodiment, sample data of the original audio signal is expressed in the form of binary values, and therefore the watermark information in the form of binary coding may be obtained and added to the original audio signal to obtain the background audio signal.

In an embodiment, the original audio signal includes a plurality of original audio signal segments arranged in a sequence. Operation 302 may include: allocating a watermark information segment to each of the original audio signal segments. Operation 303 may include: respectively adding the plurality of allocated watermark information segments to the corresponding original audio signal segments to obtain a plurality of background audio signal segments corresponding to the plurality of original audio signal segments, and combining the plurality of obtained background audio signal segments according to the sequence in which the plurality of original audio signal segments are arranged in the original audio signal, to obtain the background audio signal.

In another embodiment, different angles (or perspectives) used for analyzing the signals are referred to as domains. A time domain and a frequency domain are basic properties of a signal. A signal that is described from the perspective of the time domain is a time-domain signal, and a signal that is described from the perspective of the frequency domain is a frequency-domain signal. Therefore, the audio signal has a corresponding audio time-domain signal and an audio frequency-domain signal, and the audio time-domain signal and the audio frequency-domain signal may be mutually transformed.

The watermark information may be added to the original audio signal based on the audio time-domain signal or the audio frequency-domain signal.

Figure 4:
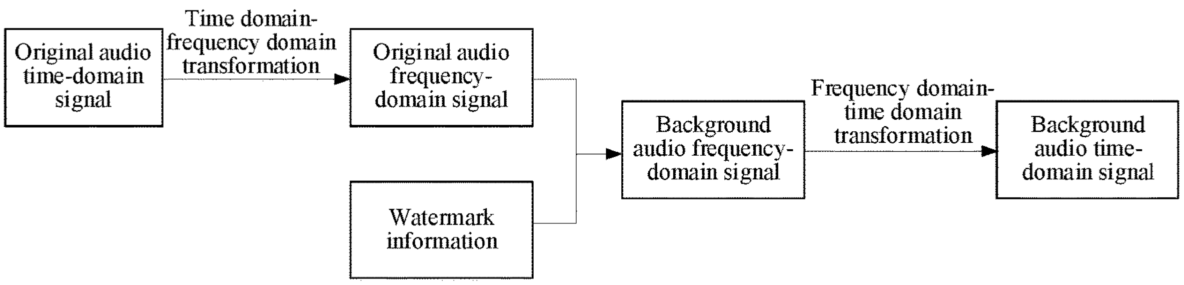
FIG. 4 is a schematic diagram of a process of adding watermark information according to an embodiment of the disclosure.

FIG. 4 is a schematic diagram of a process of adding watermark information according to an embodiment of the disclosure. Referring to FIG. 4, the original audio signal is an original audio time-domain signal, and the background audio signal is a background audio time-domain signal. Operation 303 may include: transforming the original audio time-domain signal to obtain an original audio frequency-domain signal corresponding to the original audio time-domain signal, adding the watermark information to the original audio frequency-domain signal to obtain a background audio frequency-domain signal, and inversely transforming the background audio frequency-domain signal to obtain the background audio time-domain signal.

With regard to the method for transforming the audio signal, the audio time-domain signal may be transformed by using a time domain-frequency domain transformation algorithm to obtain the corresponding audio frequency-domain signal. The audio frequency-domain signal may be transformed by using a frequency domain-time domain transformation algorithm to obtain the corresponding audio time-domain signal. The time domain-frequency domain transformation algorithm and the frequency domain-time domain transformation algorithm are mutually inverse transformation.

The time domain-frequency domain transformation algorithm may include a combination of one or more of the algorithms such as discrete cosine transform, discrete wavelet transform, fast Fourier transform, and the like. For example, the discrete wavelet transform algorithm is first used for performing discrete wavelet transform, and then the discrete cosine algorithm is used for performing discrete cosine transform. Alternatively, a singular value decomposition method may further be used for time domain-frequency domain transformation.

The frequency domain-time domain transformation algorithm may include a combination of one or more of the algorithms such as inverse discrete cosine transform, inverse discrete wavelet transform, fast Fourier transform, and the like. For example, the inverse discrete wavelet transform is used to inversely transform the audio frequency-domain signal to obtain the corresponding audio time-domain signal.

304. Establish a correspondence between the original audio signal and the watermark information as a preset correspondence.

After the watermark information is allocated to the original audio signal, the correspondence between the original audio signal and the watermark information may further be established as the preset correspondence, so that the original audio signal is associated with the watermark information, and the original audio signal corresponding to the watermark information may be subsequently queried according to the preset correspondence.

In an embodiment, when the original audio signal includes a plurality of original audio signal segments arranged in a sequence and a watermark information segment is allocated to each of the original audio segments, the server may establish a preset correspondence between each of the original audio signal segments and the allocated watermark information segment.

In another embodiment, the server may create a preset database. Each time the server allocates the watermark information to an original audio signal, the preset correspondence between the original audio signal and the watermark information may be added to the preset database.

In the embodiment of the disclosure, operation 304 is performed after operation 303 only by way of example for description, and is not necessarily performed in ascending order. Operation 304 may be performed in parallel with operation 303 or performed before operation 303.

After the background audio signal is generated and the preset correspondence is established, the server may publish the background audio signal, and the background audio signal may be supported by a plurality of devices for playback. When the audio signal is collected during playing of the above background audio signal, the background audio signal may be filtered out from the audio signal by using the method described in the following embodiment. An illustrative process is described in the following embodiment.

The foregoing embodiment is merely an example of establishing a preset correspondence between the original audio signal and the watermark information. By performing the foregoing operations 301-304 one or more times, at least one preset correspondence between the original audio signal and the corresponding watermark information may be established.

The foregoing embodiment is merely an example of the process of establishing the preset correspondence by the server by way of example for description. In another embodiment, the preset correspondence between the original audio signal and the watermark information may further be established by a smart device.

For example, one or more smart devices may establish a preset correspondence between the original audio signal and the watermark information added to the original audio signal, and store the preset correspondence. In addition, the one or more smart devices may further transmit the established preset correspondence to the server for storage.

Figure 5:
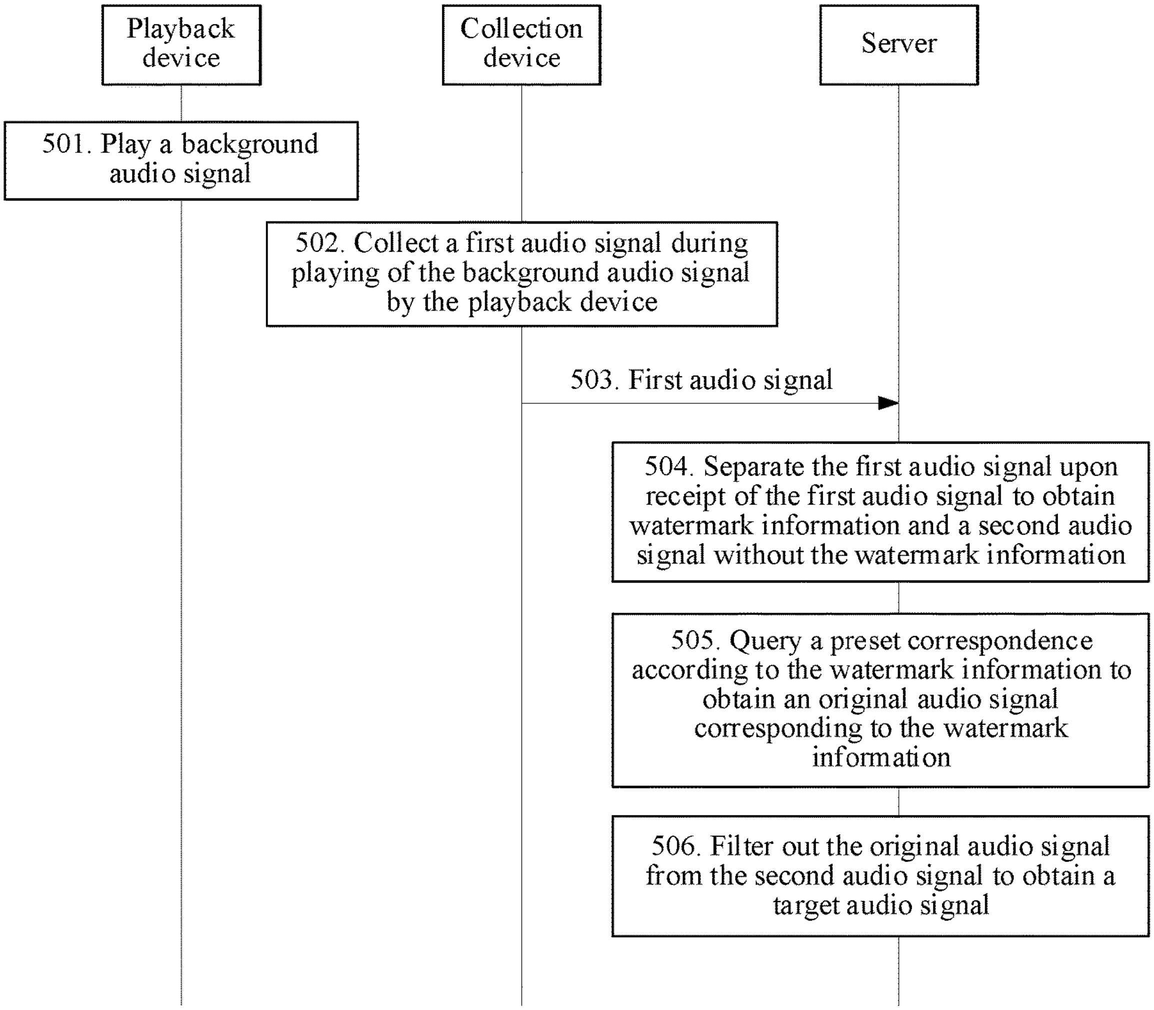
FIG. 5 is an interaction flowchart of a method for filtering out a background audio signal according to an embodiment of the disclosure.

FIG. 5 is an interaction flowchart of a method for filtering out a background audio signal according to an embodiment of the disclosure. The embodiment of the disclosure describes the operation process of filtering out the background audio signal. Interaction subjects include the playback device, the collection device, and the server shown in FIG. 2. Referring to FIG. 5, the method includes:

501. The playback device plays the background audio signal.

The playback device is connected to the server through a network, so that the audio signals provided by the server may be played.

In an embodiment, the server transmits the background audio signal to the playback device, and the playback device receives and stores the background audio signal in its own storage space. When it is detected that a user triggers an operation of playing the background audio signal, the background audio signal is played.

In another embodiment, the server provides a list of identification information for the playback device. The list of identification information includes identification information of a plurality of background audio signals, and the playback device displays the list of identification information for the user to view. When it is detected that the user chooses to play the background audio signal corresponding to any identification information in the list of identification information, the playback device transmits a playback request carrying the selected identification information to the server, and the server obtains and transmits the background audio signal corresponding to the identification information to the playback device, so that the playback device may play the background audio signal.

502. During playing of the background audio signal by the playback device, the collection device located in the same space as the playback device collects first audio signals.

In the embodiment of the disclosure, the playback device is in the same space as the collection device, the playback device is configured to play the audio signals, and the collection device is configured to collect the audio signals within a collection range of its own audio signals. In the embodiment of the disclosure, the playback device is in the audio signal collection range of the collection device by default, and the collection device may correspondingly collect the background audio signal currently played by the playback device during collection of the first audio signals.

During playing of the background audio signal by the playback device, other target audio signals may exist in the space, such as sounds of the user or an animal, sounds of vehicles in an external space, and the like. The first audio signals collected by the collection device include at least the background audio signal, and may further include the target audio signal.

The collection device may collect the audio signal according to the received collection instruction, or may collect the audio signal in real time, or may perform collection once every preset time interval, or may further perform collection in other ways.

In an embodiment, the user triggers a collection start instruction on the collection device. After receiving the collection start instruction, the collection device starts to collect the audio signals in the space where the collection device is located. After the audio signals are collected for a period of time, the user triggers a collection stop instruction on the collection device. After receiving the collection stop instruction, the collection device stops collecting the audio signals in the space where the collection device is located, and the audio signals between the collection start moment and the collection stop moment are obtained as the first audio signals.

In an embodiment, a collection control is provided on the collection device. The collection start instruction may be triggered when an operation of the collection control is received in a state in which the audio signal is not being collected, and the collection stop instruction may be triggered when an operation of the collection control is again received in a state in which the audio signals is being collected.

For example, a playback device plays song A, and a collection button is provided on the collection device. When song A is played to the $45^{th}$ second (e.g., a reproduction location of 00:00:45 in the Hour:Minute:Second format), the user presses the collection button. At this point, the collection device starts to collect the audio signals of the current environment. The audio signals include at least song A. When song A is played to the $56^{th}$ second (e.g., a reproduction location of 00:00:56), the user presses the collection button again. At this point, the collection device stops collecting audio signals, and obtains the audio signals in the environment in which song A is played between the $45^{th}$ second and the $56^{th}$ second (e.g., 00:00:45-00:00:56). The audio signals may correspond to the first audio signals.

During playing of the background audio signal by the playback device, the collection device collects the audio signal. The playback of the background audio signal may last for a period of time. The collection device may perform collection within a collection time period, so as to collect the background audio signal played within the collection time period, that is, the first audio signals include the background audio signal played during the collection time period. Since the collection time periods are different from each other, the collected background audio signals respectively corresponding to the collection time periods are also different from each other. Therefore, the first audio signal may include part of the background audio signals or include all of the background audio signals.

In addition, since there may be other target audio signals during playing of the background audio signal by the playback device, the collection device not only may collect the background audio signals played within the collection time period during collection within the collection time period, but also may collect the target audio signals within the collection time period, that is, the first audio signals may include the background audio signals played within the collection time period and the target audio signals within the collection time period.

503. The collection device transmits the first audio signals to the server.

504. When the first audio signals are received, the server separates the first audio signals to obtain watermark information and a second audio signal without the watermark information.

The first audio signals collected by the collection device include a target audio signal and a background audio signal, and the background audio signal includes watermark information. After receiving the first audio signals transmitted by the collection device, the server may extract the watermark information from the first audio signal, and then obtain a corresponding original audio signal according to the extracted watermark information.

Therefore, the server separates the first audio signals to obtain the watermark information and the second audio signal without the watermark information. A watermark extraction algorithm may include, for example but not limited to, a coefficient quantization method, a spatial domain algorithm, a transform domain algorithm, a least significant bit algorithm, and the like, and the watermark extraction algorithm used during the separation operation matches the watermark embedding algorithm used during adding of the watermark information.

Figure 6:
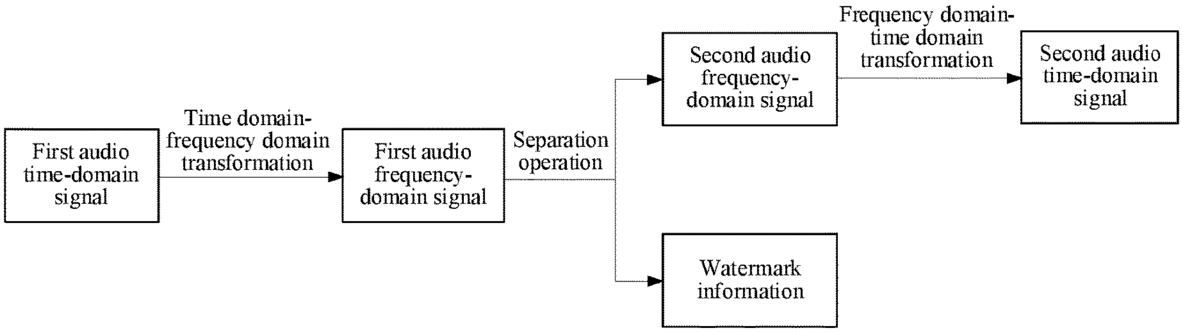
FIG. 6 is a schematic diagram of a process of separating a first audio signal according to an embodiment of the disclosure.

FIG. 6 is a schematic diagram of a process of separating a first audio signal according to an embodiment of the disclosure. Referring to FIG. 6, in some embodiments, the obtained audio signals are audio time-domain signals, while the watermark information is added to the original audio signal based on audio frequency-domain signals. Therefore, in an embodiment, the first audio signal is a first audio time-domain signal, and the second audio signal is a second audio time-domain signal.

The process of separating the first audio signal to obtain the watermark information and the second audio signal includes: transforming the first audio time-domain signal to obtain a first audio frequency-domain signal, separating the first audio frequency-domain signal to obtain the watermark information and a second audio frequency-domain signal without the watermark information, and inversely transforming the second audio frequency-domain signal to obtain a second audio time-domain signal.

505. The server queries the preset correspondence according to the watermark information, and obtains the original audio signal corresponding to the watermark information.

Since the server has established the preset correspondence between the original audio signal and the watermark information, the server may query the established preset correspondence according to the watermark information when the watermark information is obtained, and obtain the original audio signal corresponding to the watermark information by matching the separated watermark information in the preset correspondence.

In an embodiment, the preset correspondence includes a correspondence between any original audio time-domain signal and the watermark information added to the original audio time-domain signal. After the watermark information is obtained, the preset correspondence is queried according to the watermark information to obtain the original audio time-domain signal corresponding to the watermark information.

In an embodiment, the watermark information may include a plurality of watermark information segments arranged in a sequence, and the server queries the preset correspondence for the plurality of watermark information segments to obtain original audio signal segments corresponding to the plurality of watermark information segments. According to the sequence in which the plurality of watermark information segments are arranged in the watermark information, the original audio signal segments corresponding to the plurality of watermark information segments are combined to obtain the original audio signal.

506. The server filters the original audio signal from the second audio signal to obtain the target audio signal.

Since the second audio signal is the audio signal from which the watermark information has been filtered, and the original audio signal is the audio signal corresponding to the watermark information, the target audio signal may be obtained by filtering out the original audio signal from the second audio signal.

Figure 7:
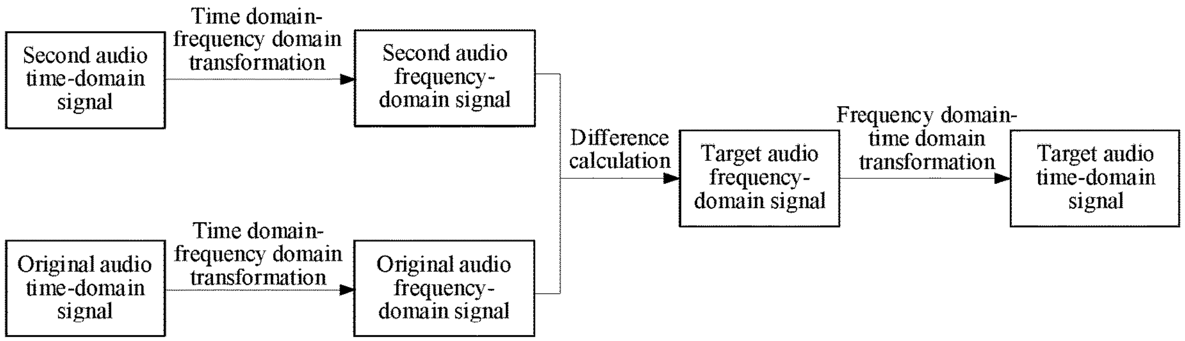
FIG. 7 is a schematic diagram of a process of obtaining a target audio signal according to an embodiment of the disclosure.

FIG. 7 is a schematic diagram of a process of obtaining a target audio signal according to an embodiment of the disclosure. Referring to FIG. 7, in an embodiment, a difference between the second audio signal and the original audio signal is obtained, and the difference is determined as the target audio signal.

The method for obtaining the difference between the second audio signal and the original audio signal includes: directly obtaining a difference between the second audio time-domain signal and the original audio time-domain signal, and determining the difference as a target audio time-domain signal, or obtaining a difference between the second audio frequency-domain signal and the original audio frequency-domain signal, and determining the difference as a target audio frequency-domain signal, and inversely transforming the target audio frequency-domain signal to obtain the target audio time-domain signal that may be directly played.

In an embodiment, the server may further perform voice recognition on the target audio signal after obtaining the target audio signal, and perform natural language processing on recognized characters to obtain keywords of the target audio signal. In an embodiment, the server may perform any of the following two operations.

Operation 1: A preset instruction library pre-stored in the server is queried according to the keywords to obtain instructions corresponding to the keywords. When the instructions are related to the playback device, the instructions are transmitted to the playback device, and the playback device performs an operation corresponding to the instructions after receiving the instructions transmitted by the server.

Operation 2: The keywords are transmitted to the collection device, the collection device queries the preset instruction library pre-stored in the collection device according to the keywords after receiving the keywords, to obtain the instructions corresponding to the keywords. When the instructions are related to the playback device, the instructions are transmitted to the playback device, and the playback device performs the operation corresponding to the instructions after receiving the instructions transmitted by the collection device.

Alternatively, the server may further perform other operations according to the target audio signal after obtaining the target audio signal.

According to the method provided in the embodiment of the disclosure, the original audio signal is obtained, watermark information is allocated to the original audio signal, the watermark information is added to the corresponding original audio signal, to obtain a background audio signal. A preset correspondence between the original audio signal and the watermark information is established, the first audio signal collected during playing of the background audio signal is obtained, and the first audio signal is separated, to obtain the watermark information and a second audio signal without the watermark information. The preset correspondence is queried according to the watermark information, to obtain the original audio signal corresponding to the watermark information, and the original audio signal is filtered out from the second audio signal, to obtain a target audio signal. According to the solution for filtering out a background audio signal as provided in the embodiments of the disclosure, only audio signals including the background audio signal and the target audio signal need to be collected, and the background audio signal may be filtered out from the collected audio signal according to the collected watermark information from the audio signal without needing to obtain an additional separate background audio signal, thereby avoiding influences caused by the background audio signal. The solution has a high universality and an expanded scope of application of the disclosure.

In addition, the target audio signal obtained based on the method provided in the embodiment of the disclosure has high accuracy, and the processing effect may be effectively improved during subsequent smart speech recognition or other processing based on the target audio signal.

In addition, in the method provided in the embodiment of the disclosure, the method for adding watermark information based on the audio frequency-domain signal has strong stability and may avoid affecting the playback effect of the audio signal to which the watermark information is added.

In addition, the method for filtering out the background audio signal by using a signal filtering model in the related art greatly depends on quality and coverage of training samples. Only when the training samples with higher quality and larger coverage are obtained, more accurate signal filtering model may be trained in the related art. However, in the method for filtering out a background audio signal through the watermark information in the embodiment of the disclosure, the signal filtering model does not need to be pre-trained and therefore it does not rely on the quality and coverage of the training samples during training of the signal filtering model, thereby improving the filtering effect.

The embodiments of the disclosure may be applicable to scenarios in which controllable background audio signals are filtered, such as a scenario in which a smart TV is controlled with voice, a scenario in which a smart speaker is controlled with voice, a scenario in which a smart vehicle terminal is controlled with voice, a scenario of scoring for singing, and the like. Through the method provided in the embodiment of the disclosure, the background audio signal may be filtered to obtain a more accurate audio signal (e.g., voice of the user), and the processing effect may be improved during subsequent processing based on the audio signal. For example, when a human voice audio signal is obtained after the background audio signal is filtered and smart speech recognition is performed based on the human voice audio signal, the accuracy of human voice audio signal is high.

For example, the method provided in the embodiment of the disclosure is applicable to the scenario in which the smart TV is controlled with voice. The implementation environment of the application scenario includes a smart TV, a smart remote control, and a voice back-end server, which are connected via a network, and the smart TV and the smart remote control are in the same space. The smart TV is configured to play videos, the smart remote control is configured to control the playing of the smart TV, and the voice back-end server is configured to process collected voice signals.

Figure 8:
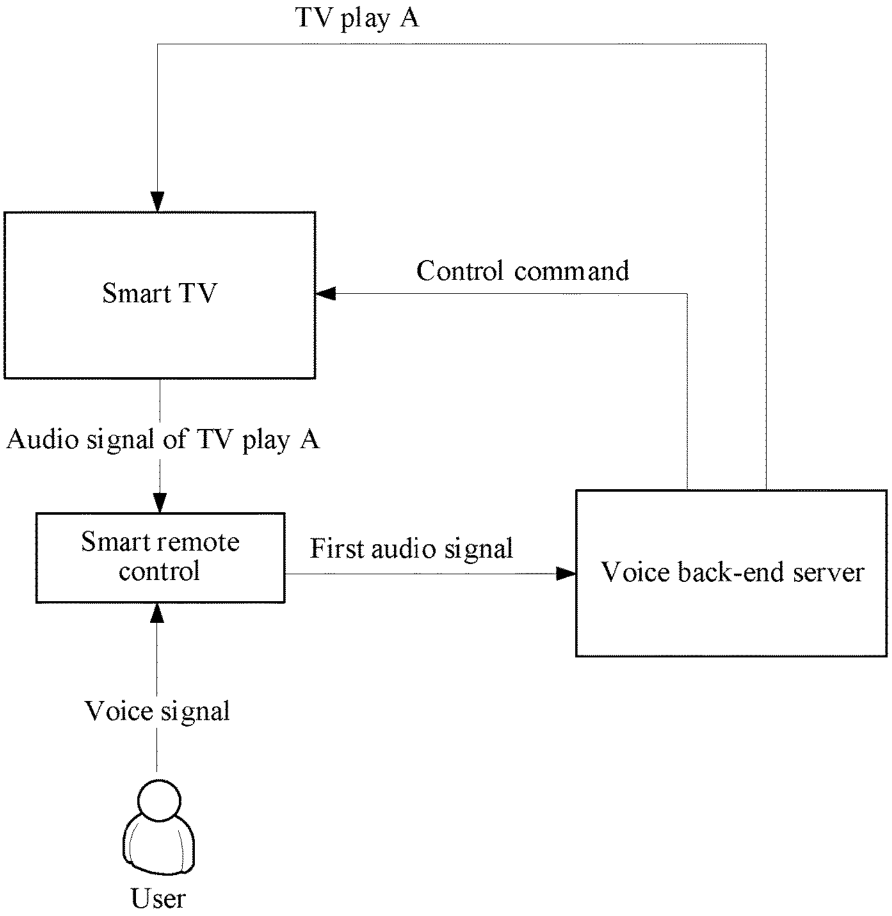
FIG. 8 is an architecture diagram of a voice control method for a smart TV according to an embodiment of the disclosure.
Figure 9:
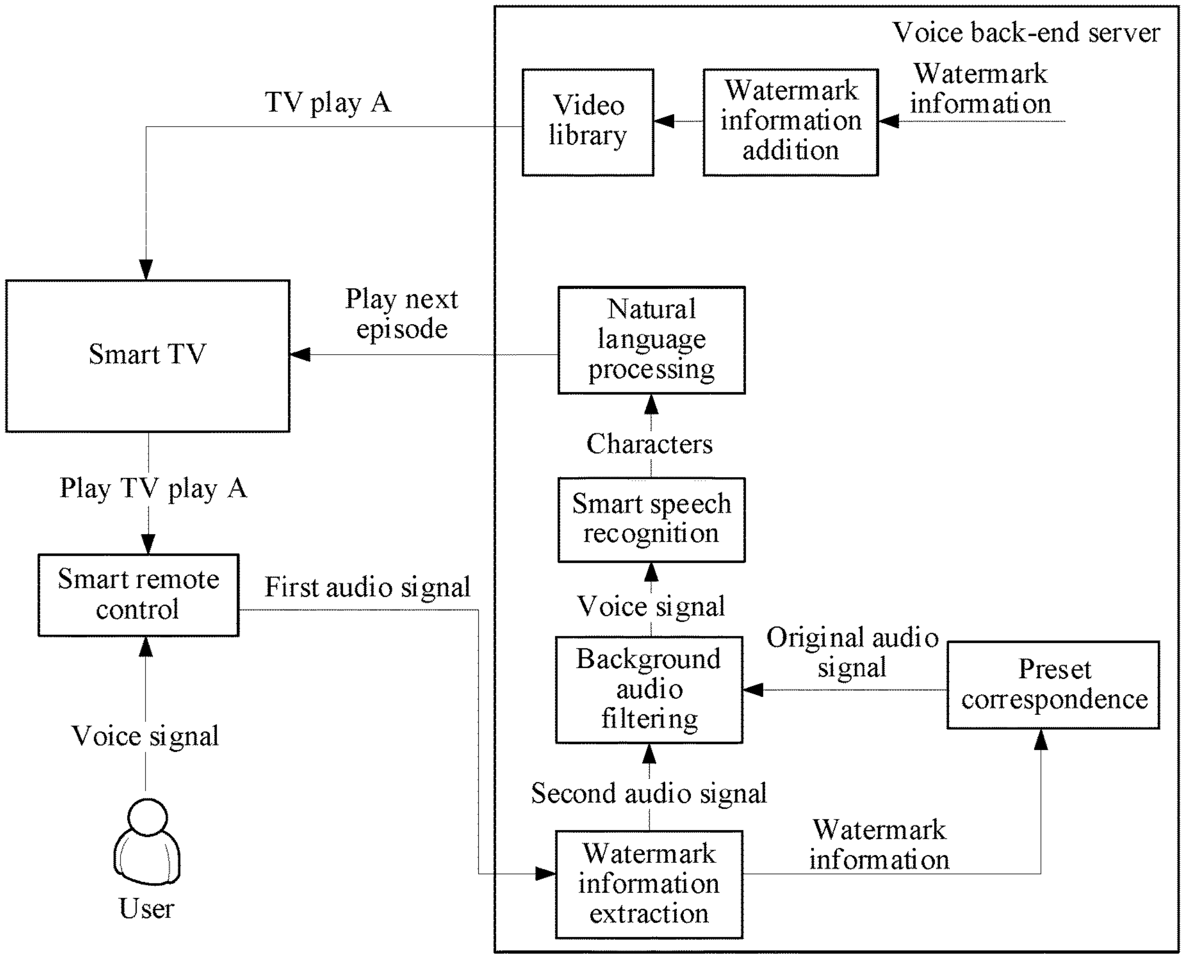
FIG. 9 is a flowchart of the voice control method for a smart TV according to an embodiment of the disclosure.
Figure 10:
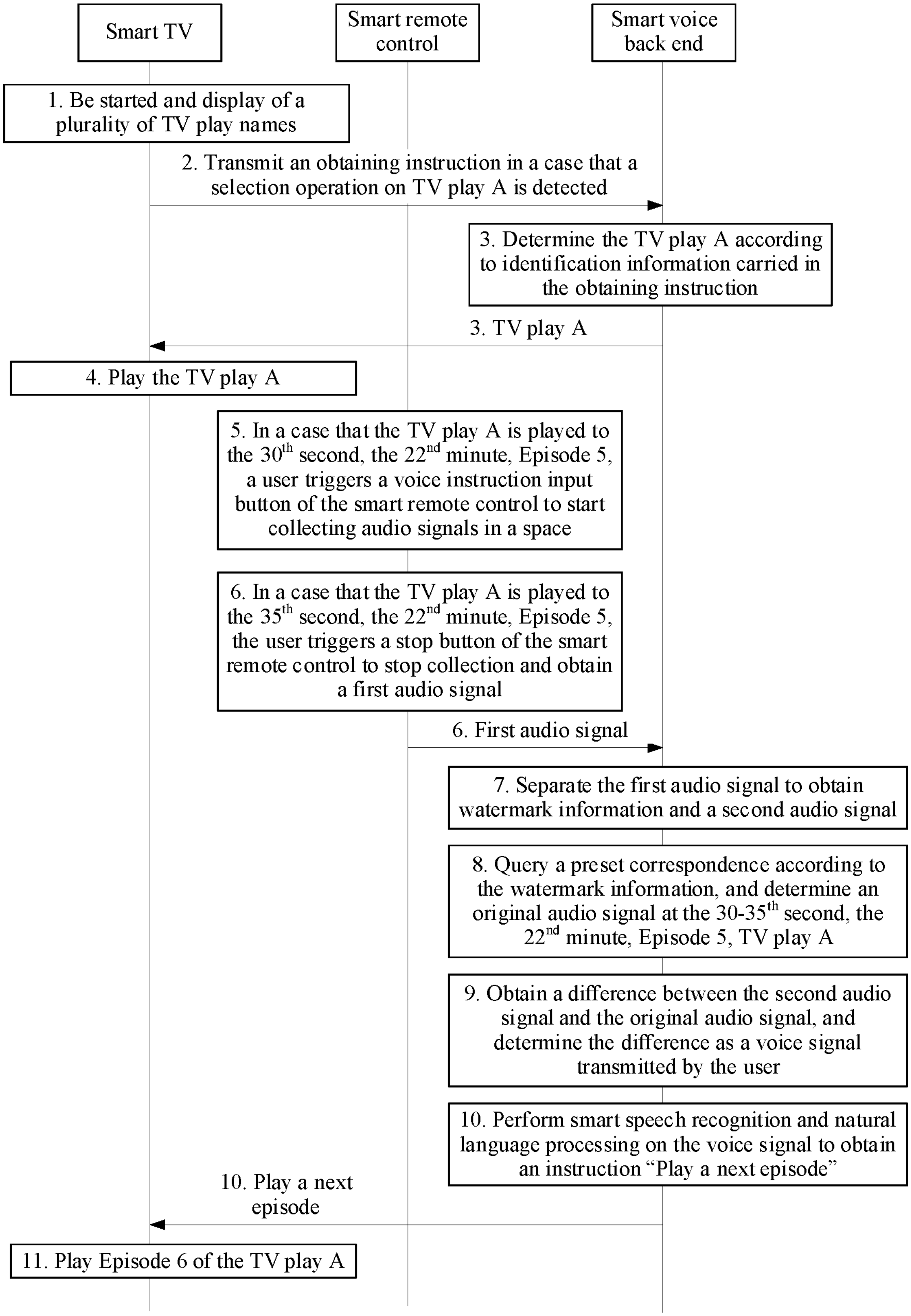
FIG. 10 is an interaction flowchart of the voice control method for a smart TV according to an embodiment of the disclosure.

FIG. 8 is an architecture diagram of a voice control method for a smart TV according to an embodiment of the disclosure, FIG. 9 is a flowchart of a voice control method for a smart TV according to an embodiment of the disclosure, and FIG. 10 is an interaction flowchart of a voice control method for a smart TV. In the embodiment of the disclosure, a user controls the smart TV through voice, and the interaction between the smart TV, the smart remote control, and the voice back-end server in the process is used as an example for description. Referring to FIG. 8, FIG. 9, and FIG. 10, the interaction process includes the following operations:

1. After the smart TV is started, a plurality of TV play names are displayed, and TV play playback resources corresponding to the plurality of TV play names are stored in a TV play library of a voice back-end server.

2. When it is detected that the user chooses to play a TV play A, the smart TV transmits an obtaining instruction to the voice back-end server, and the obtaining instruction carries a name of the TV play A.

3. When the obtaining instruction transmitted by the smart TV is received, the voice back-end server transmits the TV play A to the smart TV according to the obtaining instruction.

4. The smart TV plays the TV play A after receiving the TV play A.

5. When the TV play A is played to the $30^{th}$ second, the $22^{nd}$ minute (e.g., a reproduction location of 00:22:30), Episode 5, and a user triggers a voice instruction input button of the smart remote control, the smart remote control starts to collect audio signals in the space. At this point, the user transmits a voice signal "Please play the next episode".

6. When the TV play A is played to the $35^{th}$ second, the $22^{nd}$ minute (e.g., a reproduction location of 00:22:35), Episode 5, the user triggers a voice instruction input stop button of the intelligent remote control, the intelligent remote control stops collecting and obtains a first audio signal with a duration of 5 seconds, and the first audio signal is transmitted to the voice back-end server.

The first audio signal includes the voice signal "Please play the next episode" made by the user and the background audio signal at the $30\text{-}35^{th}$ second, the $22^{nd}$ minute, Episode 5, TV play A.

7. After receiving the first audio signal transmitted by the smart TV, the voice back-end server separates the first audio signal to obtain watermark information and a second audio signal exclusive of the watermark information.

8. The voice back-end server queries the preset correspondence according to the watermark information, and obtains the corresponding original audio signal, which is the original audio signal between the $30^{th}$ second and the $35^{th}$ second, the $22^{nd}$ minute, Episode 5, TV play A.

For example, the watermark information obtained after the separation operation includes 50 watermark information segments. The voice back-end server queries the preset correspondence according to each of the watermark information segments to obtain 50 original audio signal segments. The 50 original audio signal segments respectively correspond to 50 watermark information segments, the voice back-end server splices the 50 original audio signal segments according to the sequence in which the 50 watermark information segments are arranged in the watermark information to obtain the original audio signal.

9. The voice back-end server obtains a difference between the second audio signal and the original audio signal, and determines the difference as the voice signal transmitted by the user.

10. The voice back-end server performs smart speech recognition on the voice signal to obtain characters of "Please play the next episode", keywords "Play the next episode" are obtained through natural language processing on the characters, and an instruction "Play the next episode" corresponding to the keywords is transmitted to the smart TV.

11. After receiving the instruction "Play the next episode" transmitted by the voice back-end server, the smart TV plays Episode 6 of the TV play A.

Figure 11:
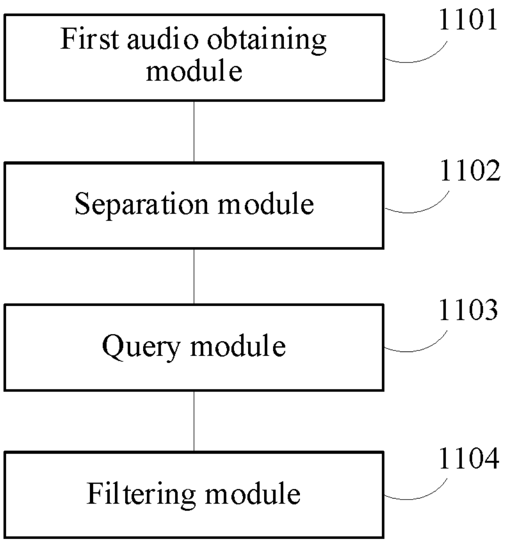
FIG. 11 is a schematic structural diagram of an apparatus for filtering out a background audio signal according to an embodiment of the disclosure.

FIG. 11 is a schematic structural diagram of an apparatus for filtering out a background audio signal according to an embodiment of the disclosure. Referring to FIG. 11, the apparatus includes:

- a first audio obtaining module 1101 configured to perform the operation of obtaining the first audio signal collected during playing of the background audio signal;
- a separation module 1102 configured to perform the operation of separating the first audio signal to obtain the watermark information and the second audio signal without the watermark information;
- a query module 1103 configured to perform the operation of querying the preset correspondence according to the watermark information to obtain the original audio signal corresponding to the watermark information; and
- a filtering module 1104 configured to perform the operation of filtering out the original audio signal from the second audio signal to obtain the target audio signal.

Figure 12:
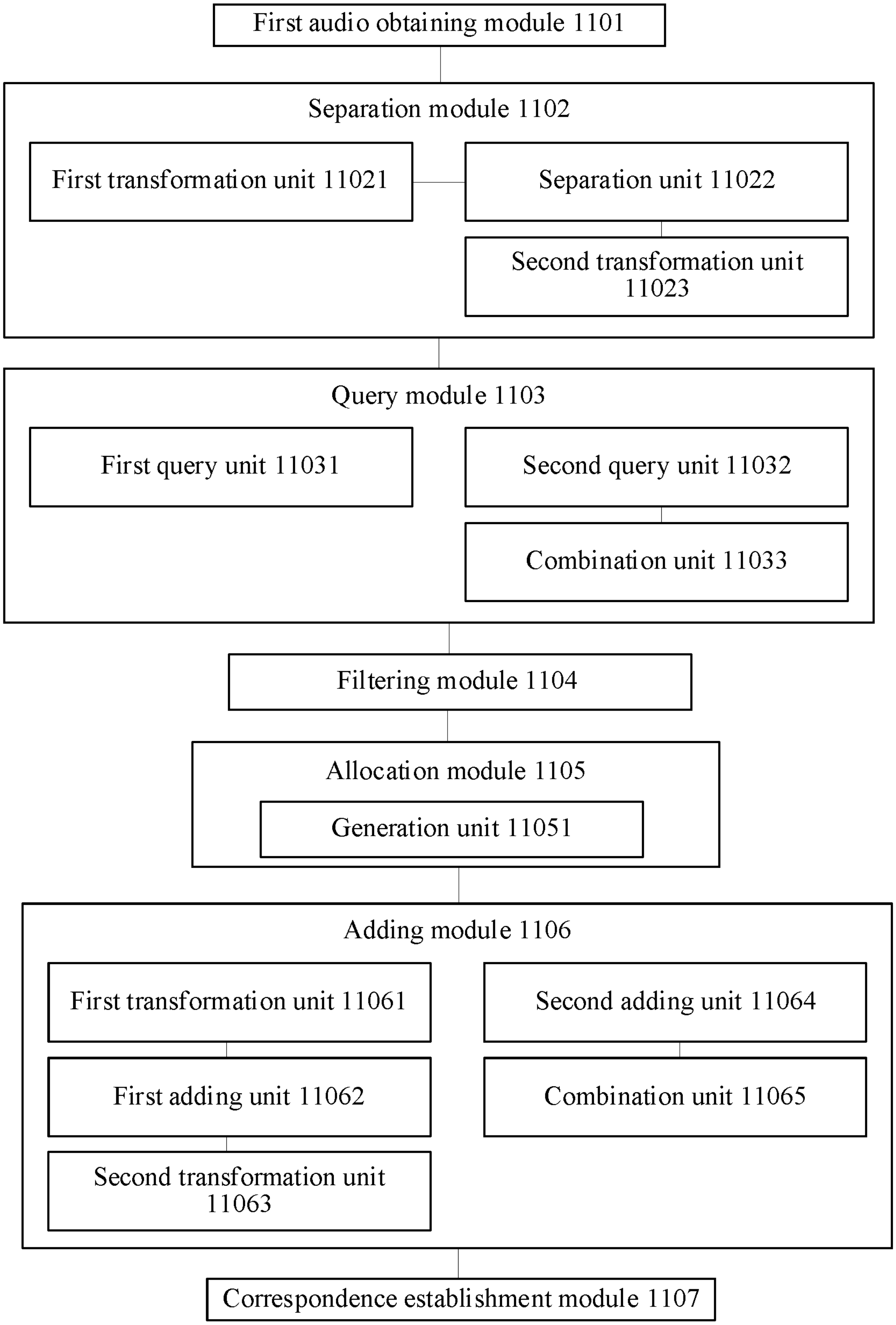
FIG. 12 is a schematic structural diagram of an apparatus for filtering out a background audio signal according to an embodiment of the disclosure.

FIG. 12 is a schematic structural diagram of an apparatus for filtering out a background audio signal according to an embodiment of the disclosure. Referring to FIG. 12, the first audio signal is a first audio time-domain signal, and the second audio signal is a second audio time-domain signal. The separation module 1102 includes:

- a first transformation unit 11021 configured to perform the operation of transforming the first audio time-domain signal to obtain a first audio frequency-domain signal;
- a separation unit 11022 configured to perform the operation of separating the first audio frequency-domain signal to obtain the watermark information and the second audio frequency-domain signal without the watermark information; and
- a second transformation unit 11023 configured to perform the operation of inversely transforming the second audio frequency-domain signal to obtain the second audio time-domain signal.

In an embodiment, the query module 1103 includes:

- a first query unit 11031 configured to perform the operation of querying the preset correspondence according to the watermark information to obtain the original audio time-domain signal corresponding to the watermark information.

In an embodiment, the query module 1103 includes:

- a second query unit 11032 configured to perform the operation of querying, when the watermark information includes the plurality of watermark information segments arranged in a sequence, the preset correspondence according to the plurality of watermark information segments separately to obtain the original audio signal segments corresponding to the plurality of watermark information segments; and
- a combination unit 11033 configured to perform the operation of combining the original audio signal segments corresponding to the plurality of watermark information segments according to the sequence in which the plurality of watermark information segments are arranged, to obtain the original audio signal.

In an embodiment, the apparatus further includes:

- an allocation module 1105 configured to perform the operation of obtaining the original audio signal and allocating the watermark information to the original audio signal;
- an adding module 1106 configured to perform the operation of adding the watermark information to the original audio signal to obtain the background audio signal; and
- a correspondence establishment module 1107 configured to perform the operation of establishing the correspondence between the original audio signal and the watermark information as the preset correspondence.

In an embodiment, the allocation module 1105 includes:

- a generation unit 11051 configured to perform the operation of obtaining identification information of the original audio signal, and generating the watermark information including the identification information according to the identification information.

In an embodiment, the original audio signal is an original audio time-domain signal, the background audio signal is a background audio time-domain signal, and the adding module 1106 includes:

a first transformation unit 11061 configured to perform the operation of transforming the original audio time-domain signal to obtain the original audio frequency-domain signal;

a first adding module 11062 configured to perform the operation of adding the watermark information to the original audio frequency-domain signal to obtain the background audio frequency-domain signal; and a second transformation unit 11063 configured to perform the operation of inversely transform the background audio frequency-domain signal to obtain the background audio time-domain signal.

In an embodiment, the original audio signal includes a plurality of original audio signal segments arranged in a sequence.

The adding module 1106 includes:

a second adding unit 11064 configured to perform the operation of respectively adding, to the corresponding original audio signal segments, the watermark information segments allocated to the plurality of original audio signal segments, to obtain the plurality of background audio signal segments corresponding to the plurality of original audio signal segments; and a combination unit 11065 configured to perform the operation of combining the plurality of background audio signal segments according to the sequence in which the plurality of original audio signal segments are arranged, to obtain the background audio signal.

According to the apparatus for filtering out a background audio signal provided in the embodiments of the disclosure, only audio signals including the background audio signal and the target audio signal need to be collected, and the background audio signal may be filtered out from the collected audio signal according to the collected watermark information from the audio signal without needing to obtain an additional separate background audio signal, avoiding influence of the background audio signal, which has a stronger versatility and expands the scope of application of the disclosure.

When the apparatus for filtering out a background audio signal provided filters the background audio signal, only the division of the foregoing functional modules is used for illustration. In an embodiment, the foregoing functions may be allocated to different modules and implemented as required, that is, an inner structure of a processing device is divided into different functional modules to implement all or some of the functions described above. In addition, the embodiments of the apparatus for filtering out a background audio signal and the method for filtering out a background audio signal provided in the foregoing embodiments belong to the same concept. An illustrative implementation process is detailed in the method embodiment, and the details are not described herein again.

Figure 13:
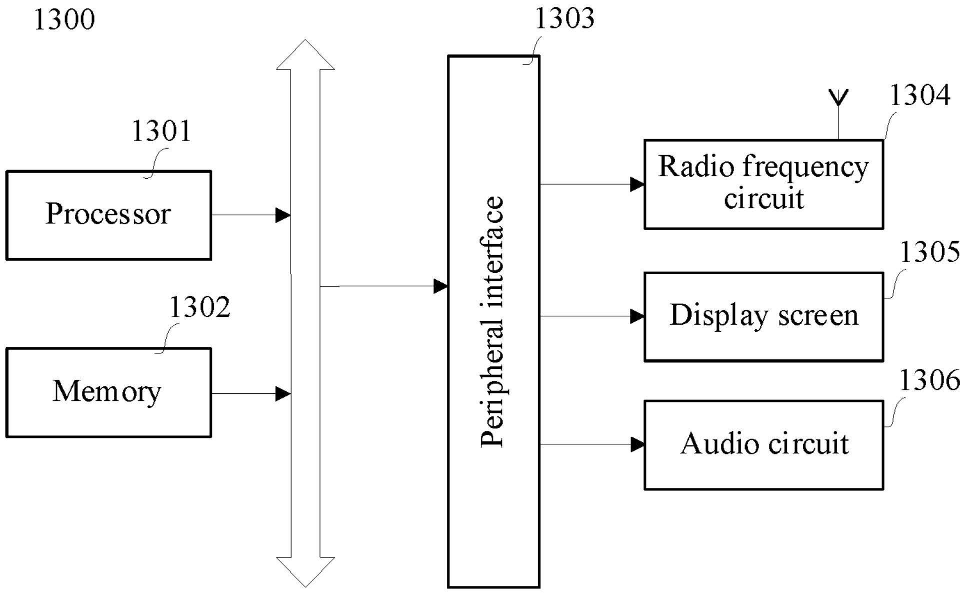
FIG. 13 is a schematic structural diagram of a terminal according to an embodiment of the disclosure.

FIG. 13 is a structural block diagram of a terminal 1300 according to an example embodiment of the disclosure. The terminal 1300 may include, for example but not limited to, a portable mobile terminal, for example: a smartphone, a tablet computer, a Moving Picture Experts Group Audio Layer III (MP3) player, a Moving Picture Experts Group Audio Layer IV (MP4) player, a notebook computer, a desktop computer, a head-mounted device, a smart TV, a smart speaker, an intelligent remote control, a smart microphone or any another smart terminal. The terminal 1300 may also be referred to as another name such as user equipment, a portable terminal, a laptop terminal, or a desktop terminal.

Generally, the terminal 1300 includes a processor 1301 and a memory 1302.

The processor 1301 may include one or more processing cores, for example, a 4-core processor or an 8-core processor. The memory 1302 may include one or more computer-readable storage media. The computer-readable storage media may be non-transitory and configured to store at least one instruction. The at least one instruction is used by the processor 1301 to implement the background audio signal filtering method provided by the method embodiment.

In some embodiments, the terminal 1300 may include: a peripheral interface 1303 and at least one peripheral. The processor 1301, the memory 1302, and the peripheral interface 1303 may be connected by using a bus or a signal cable. Each peripheral may be connected to the peripheral interface 1303 by using a bus, a signal cable, or a circuit board. Specifically, the peripheral includes: at least one of a radio frequency (RF) circuit 1304, a display screen 1305, and an audio frequency circuit 1306.

The RF circuit 1304 is configured to receive and transmit an RF signal, also referred to as an electromagnetic signal. The RF circuit 1304 communicates with a communication network and other communication devices through the electromagnetic signal.

The display screen 1305 is configured to display a user interface (UI). The UI may include a graph, text, an icon, a video, and any combination thereof. The display screen 1305 may include, for example but not limited to, a touch display screen, and may also be configured to provide virtual buttons and/or virtual keyboards.

The audio circuit 1306 may include a microphone and a speaker. The microphone is configured to collect audio signals of a user and an environment, and convert the audio signals into an electrical signal to input to the processor 1301 for processing, or input to the RF circuit 1304 for implementing voice communication. For the purpose of stereo collection or noise reduction, a plurality of microphones, respectively disposed at different portions of the terminal 1300, may be used. The microphone may further be an array microphone or an omni-directional collection type microphone. The speaker is configured to convert electric signals from the processor 1301 or the RF circuit 1304 into audio signals.

A person skilled in the art would understand that the structure shown in FIG. 13 constitutes no limitation on the terminal 1300, and the terminal may include more or fewer components than those shown in the figure, or some components may be combined, or a different component deployment may be used.

Figure 14:
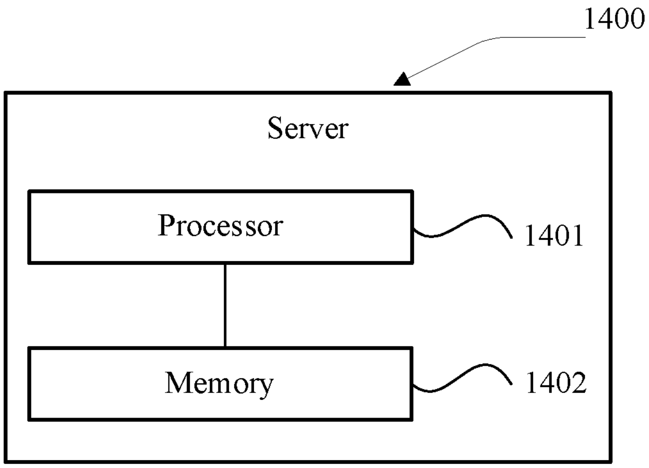
FIG. 14 is a schematic structural diagram of a server according to an embodiment of the disclosure.

FIG. 14 is a schematic structural diagram of a server according to an embodiment of the disclosure. The server 1400 may vary greatly due to different configurations or performance, and may include one or more processors (such as central processing units (CPUs)) 1401 and one or more memories 1402. The memory 1402 stores at least one instruction, the at least one instruction being loaded and executed by the processor 1401 to implement the methods provided in the foregoing method embodiments. Certainly, the server may further have components such as a wired or wireless network interface, a keyboard, and an I/O interface to facilitate I/O. The server may further include other components for implementing device functions. Details are not described herein again.

The server 1400 may be configured to perform the operations performed by the processing device in the method for filtering out a background audio signal.

An embodiment of the disclosure further provides an electronic device. The electronic device includes a processor and a memory storing a computer program, the computer program being loaded and executed by the processor to implement the operations performed in the method for filtering out a background audio signal in the foregoing embodiment.

An embodiment of the disclosure further provides a computer-readable storage medium storing a computer program, the computer program being loaded and executed by a processor to implement the operations performed in the method for filtering out a background audio signal in the foregoing embodiment.

An embodiment of the disclosure further provides a computer program product including instructions, the instructions, when run on a computer, causing the computer to perform the operations performed in the method for filtering out a background audio signal in the foregoing embodiment.

A person of ordinary skill in the art would understand that all or some of the operations of the foregoing embodiments may be implemented by hardware, or may be implemented by a program instructing relevant hardware. The program may be stored in a computer-readable storage medium. The storage medium may include a read-only memory, a magnetic disk, an optical disc, or the like.

According to the method, the apparatus and the storage medium provided in the embodiments of the disclosure, the original audio signal is obtained, watermark information is allocated to the original audio signal, the watermark information is added to the corresponding original audio signal, to obtain a background audio signal. A preset correspondence between the original audio signal and the watermark information is established, the first audio signal collected during playing of the background audio signal is obtained, and the first audio signal is separated, to obtain the watermark information and a second audio signal without the watermark information. The preset correspondence is queried according to the watermark information, to obtain the original audio signal corresponding to the watermark information, and the original audio signal is filtered out from the second audio signal, to obtain a target audio signal. According to the solution for filtering out a background audio signal as provided in the embodiments of the disclosure, only audio signals including the background audio signal and the target audio signal need to be collected, and the background audio signal may be filtered out from the collected audio signal according to the collected watermark information from the audio signal without needing to obtain an additional separate background audio signal, thereby avoiding influences caused by the background audio signal. The solution has a high universality and an expanded scope of application of the disclosure.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be embodied by a module, a program, or a part of code, which contains one or more executable instructions for performing specified logic functions, and executed by one or more microprocessors or other control apparatuses. Also, at least one of these components, elements or units may further include or be implemented by a processor such as a central processing unit (CPU) that performs the respective functions, a microprocessor, or the like. Two or more of these components, elements or units may be combined into one single component, element or unit which performs all operations or functions of the combined two or more components, elements or units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

The foregoing descriptions are merely example embodiments of the disclosure, and are not intended to limit the embodiments of the disclosure. Any modification, equivalent replacement, or improvement made within the spirit and principle of the embodiments of the disclosure shall fall within the protection scope of the disclosure.

What is claimed is:

1. A method for filtering out a background audio signal, performed by an electronic device, the method comprising:

obtaining, by the electronic device from a collection device, a first audio signal collected during playing of the background audio signal on a playback device, based on a collection start instruction received from a user during a play of the playback device, wherein the first audio signal comprises a target audio signal, the target audio signal being a voice signal corresponding to a user voice instruction, wherein the background audio signal is an audio signal obtained by adding watermark information to an original audio signal, and wherein the collection device is different from the playback device and the electronic device, wherein the watermark information is added to the original audio signal to generate the background audio signal, and the generating the background audio signal comprises:

converting the original audio signal from a time-domain signal to a frequency-domain signal, and adding the watermark information to the frequency-domain signal of the original audio signal, wherein the addition generates the background audio signal in a frequency-domain;

separating the first audio signal, to obtain the watermark information and a second audio signal without the watermark information, the second audio signal comprising the target audio signal, wherein the separating the first audio signal comprises:

transforming a first audio time-domain signal to obtain a first audio frequency-domain signal;

separating the first audio frequency-domain signal, to obtain the watermark information and a second audio frequency-domain signal without the watermark information; and inversely transforming the second audio frequency-domain signal to obtain a second audio time-domain signal;

querying a preset correspondence based on the watermark information to obtain the original audio signal, the preset correspondence comprising a correspondence between the original audio signal and the watermark information added to the original audio signal;

based on both the second audio signal and the original audio signal being in a same audio time-domain, determining a difference between the second audio signal and the original audio signal, wherein the determining the difference comprises:

transforming the second audio time-domain signal to obtain the second audio frequency-domain signal;

transforming the original audio signal from the time-domain signal to the frequency-domain signal; and determining, as a target audio frequency-domain signal, a difference between the second audio frequency-domain signal and the frequency-domain signal of the original audio signal;

inversely transforming the target audio frequency-domain signal to obtain the target audio signal in a time domain; and obtaining the target audio signal in the time domain, wherein each time the watermark information is added to the original audio signal, the preset correspondence between the original audio signal and the watermark information is added to a preset database, wherein a plurality of original audio signals of which a popularity is greater than a preset threshold are selected from a larger number of original audio signals, the popularity being determined based on one or more of an amount of a play of a corresponding original audio signal, a search volume for the corresponding original audio signal, and a number of users followed by a publisher of the corresponding original audio signal, wherein a plurality of background audio signals are generated by adding watermark information to the selected plurality of original audio signals, and wherein watermark information is not added to remaining original audio signals, of which a popularity is less than the preset threshold, of the larger number of original audio signals.

2. The method according to claim 1, wherein the original audio signal is an original audio time-domain signal, and the querying the preset correspondence comprises:

querying the preset correspondence according to the watermark information to obtain the original audio time-domain signal.

3. The method according to claim 1, wherein the watermark information comprises a plurality of watermark information segments arranged in a sequence, and the querying the preset correspondence comprises:

separately querying the preset correspondence according to each of the plurality of watermark information segments, to obtain respective original audio signal segments corresponding to the plurality of watermark information segments; and combining the respective original audio signal segments according to the sequence in which the plurality of watermark information segments are arranged, to obtain the original audio signal.

4. The method according to claim 1, further comprising, prior to the obtaining the first audio signal:

adding the watermark information to the original audio signal to obtain the background audio signal; and establishing the correspondence between the original audio signal and the watermark information as the preset correspondence.

5. The method according to claim 4, wherein the original audio signal is an original audio time-domain signal, the background audio signal is a background audio time-domain signal, and the adding the watermark information comprises:

transforming the original audio time-domain signal to obtain an original audio frequency-domain signal;

adding the watermark information to the original audio frequency-domain signal to obtain a background audio frequency-domain signal; and inversely transforming the background audio frequency-domain signal to obtain the background audio time-domain signal.

6. The method according to claim 4, wherein the original audio signal comprises a plurality of original audio signal segments arranged in a sequence, and the adding the watermark information comprises:

respectively adding, to each of the plurality of original audio signal segments, watermark information segments allocated to the plurality of original audio signal segments, to obtain a plurality of background audio signal segments corresponding to the plurality of original audio signal segments; and combining the plurality of background audio signal segments according to the sequence in which the plurality of original audio signal segments are arranged, to obtain the background audio signal.

7. The method according to claim 1, wherein the watermark information comprises identification information of the original audio signal.

8. An electronic device, comprising at least one processor and at least one memory storing a computer program, the computer program being executable by the at least one processor to perform the method according to claim 1.

9. The method according to claim 1, wherein a collection button is provided on the collection device, and the collection start instruction is received via a first pressing of the collection button by the user, and wherein a collection time period in which the first audio signal is collected is defined as a time period from a time of the first pressing of the collection button to a time period of a second pressing of the collection button by the user.

10. An apparatus for filtering out a background audio signal, the apparatus comprising:

at least one memory configured to store program code; and at least one processor configured to read the program code and operate as instructed by the program code, the program code comprising:

first audio obtaining code configured to cause the at least one processor to obtain, by an electronic device from a collection device, a first audio signal collected during playing of the background audio signal on a playback device, based on a collection start instruction received from a user during a play of the playback device, wherein the first audio signal comprises a target audio signal, the target audio signal being a voice signal corresponding to a user voice instruction, wherein the background audio signal is an audio signal obtained by adding watermark information to an original audio signal, and wherein the collection device is different from the playback device and the electronic device, wherein the watermark information is added to the original audio signal to generate the background audio signal, and the generating the background audio signal comprises:

converting the original audio signal from a time-domain signal to a frequency-domain signal, and adding the watermark information to the frequency-domain signal of the original audio signal, wherein the addition generates the background audio signal in a frequency-domain;

separation code configured to cause the at least one processor to separate the first audio signal to obtain the watermark information and a second audio signal without the watermark information, the second audio signal comprising the target audio signal, wherein separating the first audio signal comprises:

transforming a first audio time-domain signal to obtain a first audio frequency-domain signal;

separating the first audio frequency-domain signal, to obtain the watermark information and a second audio frequency-domain signal without the watermark information; and inversely transforming the second audio frequency-domain signal to obtain a second audio time-domain signal;

query code configured to cause the at least one processor to query a preset correspondence based on the watermark information to obtain the original audio signal, the preset correspondence comprising a correspondence between the original audio signal and the watermark information added to the original audio signal;

determining code configured to cause the at least one processor to, based on both the second audio signal and the original audio signal being in the same audio time-domain, determine a difference between the second audio signal and the original audio signal, wherein determining the difference comprises:

transforming the second audio time-domain signal to obtain the second audio frequency-domain signal;

transforming the original audio signal from the time-domain signal to the frequency-domain signal; and determining, as a target audio frequency-domain signal, a difference between the second audio frequency-domain signal and the frequency-domain signal of the original audio signal;

transformation code configured to cause the at least one processor to inversely transform the target audio frequency-domain signal to obtain the target audio signal in a time domain; and filtering code configured to cause the at least one processor to obtain the target audio signal in the time domain, wherein each time the watermark information is added to the original audio signal, the preset correspondence between the original audio signal and the watermark information is added to a preset database, wherein a plurality of original audio signals of which a popularity is greater than a preset threshold are selected from a larger number of original audio signals, the popularity being determined based on one or more of an amount of a play of a corresponding original audio signal, a search volume for the corresponding original audio signal, and a number of users followed by a publisher of the corresponding original audio signal, wherein a plurality of background audio signals are generated by adding watermark information to the selected plurality of original audio signals, and wherein watermark information is not added to remaining original audio signals, of which a popularity is less than the preset threshold, of the larger number of original audio signals.

11. The apparatus according to claim 10, wherein the original audio signal is an original audio time-domain signal, and the query code is further configured to cause the at least one processor to query the preset correspondence according to the watermark information to obtain the original audio time-domain signal.

12. The apparatus according to claim 10, wherein the watermark information comprises a plurality of watermark information segments arranged in a sequence, and the query code comprises:

query sub-code configured to cause the at least one processor to separately query the preset correspondence according to each of the plurality of watermark information segments, to obtain respective original audio signal segments corresponding to the plurality of watermark information segments; and first combining sub-code configured to cause the at least one processor to combine the respective original audio signal segments according to the sequence in which the plurality of watermark information segments are arranged, to obtain the original audio signal.

13. The apparatus according to claim 10, wherein the program code further comprises:

adding code configured to cause the at least one processor to add the watermark information to the original audio signal to obtain the background audio signal; and correspondence establishment code configured to cause the at least one processor to establish the correspondence between the original audio signal and the watermark information as the preset correspondence.

14. The apparatus according to claim 13, wherein the original audio signal is an original audio time-domain signal, the background audio signal is a background audio time-domain signal, and the adding code comprises:

third transformation sub-code configured to cause the at least one processor to transform the original audio time-domain signal to obtain an original audio frequency-domain signal;

first adding sub-code configured to cause the at least one processor to add the watermark information to the original audio frequency-domain signal to obtain a background audio frequency-domain signal; and fourth transformation sub-code configured to cause the at least one processor to inversely transform the background audio frequency-domain signal to obtain the background audio time-domain signal.

15. The apparatus according to claim 13, wherein the original audio signal comprises a plurality of original audio signal segments arranged in a sequence, and the adding code comprises:

second adding sub-code configured to cause the at least one processor to respectively add, to each of the plurality of original audio signal segments, watermark information segments allocated to the plurality of original audio signal segments, to obtain a plurality of background audio signal segments corresponding to the plurality of original audio signal segments; and second combining sub-code configured to cause the at least one processor to combine the plurality of background audio signal segments according to the sequence in which the plurality of original audio signal segments are arranged, to obtain the background audio signal.

16. The apparatus according to claim 10, wherein the watermark information comprises identification information of the original audio signal.

17. A non-transitory computer-readable storage medium storing a computer program, the computer program being executable by at least one processor to perform:

obtaining, by an electronic device from a collection device, a first audio signal collected during playing of a background audio signal on a playback device, based on a collection start instruction received from a user during a play of the playback device, wherein the first audio signal comprises a target audio signal, the target audio signal being a voice signal corresponding to a user voice instruction, wherein the background audio signal is an audio signal obtained by adding watermark information to an original audio signal, and wherein the collection device is different from the playback device and the electronic device, wherein the watermark information is added to the original audio signal to generate the background audio signal, and the generating the background audio signal comprises:

converting the original audio signal from a time-domain signal to a frequency-domain signal, and adding the watermark information to the frequency-domain signal of the original audio signal, wherein the addition generates the background audio signal in a frequency-domain;

separating the first audio signal to obtain the watermark information and a second audio signal without the watermark information, the second audio signal comprising the target audio signal, wherein separating the first audio signal comprises:

transforming a first audio time-domain signal to obtain a first audio frequency-domain signal;

separating the first audio frequency-domain signal, to obtain the watermark information and a second audio frequency-domain signal without the watermark information; and inversely transforming the second audio frequency-domain signal to obtain a second audio time-domain signal;

querying a preset correspondence based on the watermark information to obtain the original audio signal, the preset correspondence comprising a correspondence between the original audio signal and the watermark information added to the original audio signal;

based on both the second audio signal and the original audio signal being in the same audio time-domain, determining a difference between the second audio signal and the original audio signal, wherein the determining the difference comprises:

transforming the second audio time-domain signal to obtain the second audio frequency-domain signal;

transforming the original audio signal from the time-domain signal to the frequency-domain signal; and determining, as a target audio frequency-domain signal, a difference between the second audio frequency-domain signal and the frequency-domain signal of the original audio signal;

inversely transforming the target audio frequency-domain signal to obtain the target audio signal in a time domain; and obtaining the target audio signal in the time domain, wherein each time the watermark information is added to the original audio signal, the preset correspondence between the original audio signal and the watermark information is added to a preset database, wherein a plurality of original audio signals of which a popularity is greater than a preset threshold are selected from a larger number of original audio signals, the popularity being determined based on one or more of an amount of a play of a corresponding original audio signal, a search volume for the corresponding original audio signal, and a number of users followed by a publisher of the corresponding original audio signal, wherein a plurality of background audio signals are generated by adding watermark information to the selected plurality of original audio signals, and wherein watermark information is not added to remaining original audio signals, of which a popularity is less than the preset threshold, of the larger number of original audio signals.

* * * * *